UNITED STATES PATENT OFFICE.

ALICE MARION HART, OF LONDON, ENGLAND.

PROCESS FOR PREPARING A DYE BASE.

1,362,879.  Specification of Letters Patent.  Patented Dec. 21, 1920.

No Drawing.  Application filed July 31, 1918.  Serial No. 247,588.

*To all whom it may concern:*

Be it known that I, ALICE MARION HART, a subject of the King of England, residing at Hampstead, London, N. W. 3, England, have invented certain new and useful Improvements in Processes for Preparing a Dye Base, of which the following is a specification.

The present invention has for its object the obtaining of a dye-base from peat, which dye-base can, in some instances, be employed as a dye.

The dye-base according to this invention consists of what is hereinafter termed an acid filtrate in liquid or dried form obtained from the treatment of peat with sulfuric and nitric acid either in succession or together.

After treatment of the peat with the acids, some of the material may remain in the mass of the peat and require to be extracted therefrom with the aid of water, for example boiling water. The peat residue is separated from the dye-base by filtration and either the resulting solution, or the dried material obtained by evaporating the solution, constitutes the aforesaid acid filtrate, and either of these products will hereinafter be included in the term "acid filtrate."

It has previously been proposed to obtain a dye-base by treating peat with sulfuric acid or with nitric acid, the resulting filtrate being the required dye-base, but I have found that better results are obtained by treating the peat with both sulfuric and nitric acid to produce the required dye-base.

Preferably a portion (for example the greater portion) of the iron found present in the acid filtrate is removed before utilizing the dye-base, by precipitating the said iron with a suitable precipitant, as, for example potassium ferro-cyanid.

A further feature of the invention consists in providing a dye-base consisting of the acid filtrate in the form of crystals produced by neutralizing the said filtrate with an alkaline salt, preferably an alkaline carbonate, and evaporating the solution to the point of crystallization. These crystals will hereinafter be referred to as "filtrate crystals."

Further, a dye-stuff may be produced according to this invention by submitting the acid filtrate, or a solution of the crystals, to a diazotizing process such as is commonly applied to para-nitranilin in azo dyeing. The process of dyeing may consist in dyeing material with the dye-stuff produced by the diazotizing process as aforesaid, in conjunction with a bath containing a developer, for example β-naphthol, preceding or following the said dye stuff bath as grounding or developing bath respectively in the manner commonly employed in azo dyeing, or with the addition of a metallic salt to the grounding bath.

According also to this invention, a product is obtained which enables cotton to be dyed in the cold with dye-stuffs which ordinarily this fiber will not retain.

The peat is subjected to a drying process, air or sun drying being sufficient, and is reduced to a fine powder. It is not desirable to dry it by any method which involves pressing out the water.

The dried and powdered peat is mixed with its own weight of concentrated sulfuric acid (sp. gr. 1.8) and is well stirred for about 15 minutes. Water to half the weight of sulfuric acid is then added with extreme care, the mixture stirred and allowed to cool. A second quantity of water equal to the first is then similarly added.

This mixture of peat and sulfuric acid and water is subjected to the action of concentrated nitric acid (sp. gr. 1.4) in the proportion of half the weight of sulfuric acid used. The nitric acid is added in small amounts at intervals of about 10 minutes. It may be advisable, in some cases, to add further small quantities of sulfuric acid to stimulate activity.

The whole of these operations require extreme care on account of the violence of the reactions, which necessitate that the reagents should be added in small quantities at a time and that sufficient time should be given for each quantity to produce its desired effect before more is added.

When all the nitric acid has been added, half of its weight of water is added and the whole is stirred while being subjected to a temperature not exceeding 212° F.

The mixture is pressed, strained and filtered and further extracts are made from the residue by means of water which may be used boiling.

Alternatively a mixture of sulfuric and nitric acids of the strengths above stated and in the proportion of 2 of the former to 1 of the latter, together with 1 part of water, is added to two parts of powdered peat. The same precautions are observed.

The acid filtrates largely diluted with water constitute yellow and golden brown dyes.

Acid filtrates diluted to reduce the acidity have a marked influence on cottons in making them readily absorbent in the cold of a coloring material to which they are generally inimical. Thus if cotton cloth be immersed in a bath of dilute acid filtrate, and while still damp be placed in a cold bath of cochineal dye and left, say for twelve hours, it will be dyed a brilliant red.

As stated, it may be found in many cases to be advantageous to remove part of the iron found to be present in the acid filtrate. For example, if to a quart of acid filtrate, $\frac{1}{2}$ oz. of a 10% solution of ferrocyanid of potassium be added, a blue precipitate is thrown down. This is filtered off and the filtrate thus obtained is found, in some cases, to yield brighter colors than can be obtained by the original acid filtrate. The treatment may be continued until no more precipitate is formed.

Filtrate crystals are produced from the acid filtrates by neutralizing the same with sodium carbonate or potassim bicarbonate, or other suitable alkaline salt, and crystallizing out. Recrystallization is advisable.

A solution of filtrate crystals may be treated in the same way as an acid filtrate.

It is known, in the diazotizing process of dyeing with azo dyes, to employ what are commonly termed the grounding or the developing and the diazo baths. A procedure forming a close analogy to that process may be followed according to this invention, but a dye-stuff is employed for the diazo bath produced by applying either the acid filtrate or the solution of the filtrate crystals to a diazotizing process such, for example, as is applied to para-nitranilin in azo dyeing.

Diazotization is rapidly effected by addition of sodium nitrite in the usual way, hydrochloric acid being used if needed to give sufficient acidity. After about 20 minutes the usual sodium acetate solution may be added or it may be omitted altogether, in which case the plain diazo bath is used.

The above bath is warmed to about 110° F. and the material to be dyed is immersed in it for a few minutes, squeezed lightly and dried.

If the filtrate used is weak in acid, so that the latter is insufficient for the diazotization process, hydrochloric acid must be added to the bath.

The diazo bath may be prepared as follows:

| | |
|---|---|
| Acid filtrate | 1 part |
| Water | 4–8 part |
| Hydrochloric acid (concentrated; commercial "strong") | $\frac{1}{8}$–$\frac{1}{12}$ parts |
| Nitrate of soda | $\frac{1}{50}$–$\frac{1}{25}$ parts |

Alternatively, the grounding bath may be omitted and the cloth mordanted with a metallic salt as for example with 1 to 2% of its weight of potassium cyanid or potassium ferro-cyanid. The mordanted cloth is then immersed in the bath of diazotized filtrate, after which it must be immersed in a developing bath. The latter must contain any of the well-known developers commonly employed in azo dyeing.

Acetate of soda may or may not be added to the diazo bath in the known manner commonly practised.

The term dye-base employed in the specification and claims is intended to mean a substance which may be a dye or convertible into a dye or used in dyeing according to the invention herein described and claimed, and is not to be interpreted in the restricted sense in which it is sometimes applied in technical literature.

What I claim as my invention and desire to secure by Letters Patent is:—

1. The process for preparing a dye base from peat which comprises treating peat with sulfuric and nitric acids.

2. The process for preparing a dye base from peat which comprises treating peat with sulfuric acid and thereafter nitrating the mixture.

3. The process for preparing a dye base from peat which comprises treating peat with sulfuric acid and thereafter nitrating the mixture and filtering from the insoluble residue.

4. The process for preparing a dye base from peat which comprises treating peat with sulfuric and nitric acids, filtering from the insoluble residue, and diluting the filtrate with water.

5. The process for preparing a dye base from peat which comprises treating peat with sulfuric acid, thereafter adding water, then nitrating the mixture, and filtering from the insoluble residue.

6. The process for preparing a dye base from peat which comprises treating peat with sulfuric and nitric acids, filtering from the insoluble residue, diluting the filtrate with water and removing iron from the solution.

7. The process for producing a dye base from peat which comprises treating peat with sulfuric acid, adding water, nitrating the mixture, filtering from the insoluble residue, diluting the filtrate with water and removing iron from the solution.

8. The process for preparing a dye base from peat which comprises treating air-dried disintegrated peat with sulfuric acid, adding water, nitrating the mixture, and filtering from the insoluble residue.

9. The process for preparing a dye base from peat which comprises treating air-dried disintegrated peat with sulfuric acid, adding water, nitrating the mixture, filtering from the insoluble residue, diluting the filtrate with water and removing iron from the solution.

10. The process for preparing a dye base from peat, which comprises treating air-dried powdered peat with an equal weight of sulfuric acid, adding water, in quantity equal to half the weight of the acid, with agitation, allowing to cool, adding a further and equal quantity of water, nitrating the mixture with nitric acid in the proportion of half the weight of the sulfuric acid taken, then adding an equal weight of water, agitating the mixture with application of heat not exceeding a temperature of 212° F., and filtering from the insoluble residue.

11. The process for preparing a dye base from peat which comprises treating two parts of air-dried powdered peat with a mixture of sulfuric and nitric acids in the proportion of two parts of the former and one part of the latter together with one part of water, and filtering from the insoluble residue.

In testimony whereof I affix my signature.

ALICE MARION HART.